Nov. 7, 1944.          C. H. WALSH          2,362,424
TANK-WALL TEMPERATURE INDICATING DEVICE
Filed Aug. 7, 1942
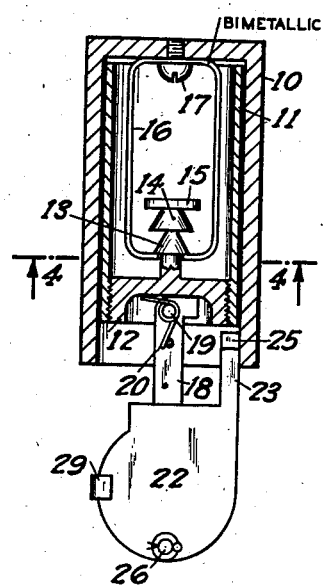
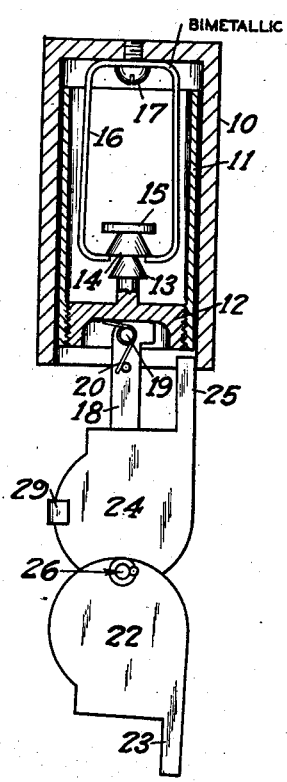
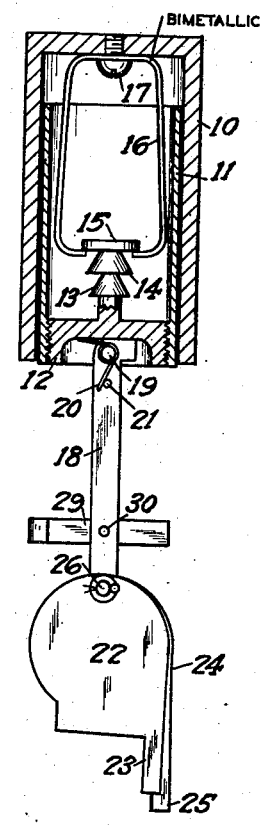
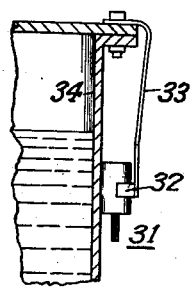
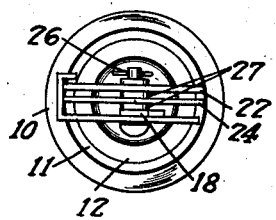
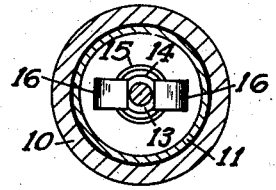
INVENTOR
Carroll H. Walsh Patented Nov. 7, 1944

2,362,424

UNITED STATES PATENT OFFICE 2,362,424

TANK-WALL TEMPERATURE INDICATING DEVICE

Carroll H. Walsh, Pine Bluff, Ark.

Application August 7, 1942, Serial No. 454,071

7 Claims. (Cl. 116—114.5)

This invention relates generally to temperature indicators, and more particularly to an indicator adapted for mounting upon the external surface of a tank-wall of a container to indicate attainment of certain predetermined temperatures.

Among the objects of the present invention may be noted the provision of a housing containing a bimetallic element mounted for lateral or bending movement only and a movable member for engaging the element in a plurality of positions each corresponding to a predetermined temperature of the element, together with common guide means for limiting the movement of the element and the movable member, in which the mutual cooperation of the element and the guide means provides supporting means to maintain the movable member within the housing irrespective of the temperature of the bimetallic element; the provision of indicating means externally of the housing for visually indicating the internal position of the movable member, the arrangement being such that a small movement of the movable member results in a relative large movement of the external indicating means; and the provision of a device in which certain elements perform a plurality of functions, thereby accomplishing a simple and inexpensive construction. Other objects will be in part obvious, and in part pointed out hereinafter.

The invention comprises certain of the elements and combinations thereof, features of construction and arrangement of parts to be exemplified in the description to follow, and the scope of the invention will be indicated in the accompanying claims.

In the drawing: Fig. 1 is a side elevational view of the invention, shown in the normal position, and illustrated partly in section; Figs. 2 and 3 are similar views showing the device respectively in a first and a second indicating position; Fig. 4 is a section along the line 4—4 of Fig. 1; Fig. 5 is an end view of the device in the normal position; and Fig. 6 illustrates an application of the device to a tank-wall.

A housing or tubular container 10, closed at its upper end and open at its lower end, contains the bimetallic element 16, the movable member 12, and the guide sleeve 11. The bimetallic element 16 is rigidly secured to the top of the container 10 by means of the screw 17, and the two arms thereof extend downwardly in spaced relationship to a point near the lower end of the container 10, at which point the respective lower ends of the element are bent inwardly to provide a pair of substantially horizontal surfaces for engagement with the stepped detents 13, 14 or 15 of the movable member 12.

The hollow cylindrical guide sleeve 11 has an outside diameter substantially equal to that of the internal diameter of the container 10, so that it may move reciprocably therein, and is interposed between the container and the movable member 12 and rigidly secured to the latter by cooperating threads. The length of the sleeve 11 is such that the lower detent 13 is engaged with the bimetallic element 16 when the upper end of the sleeve 11 is engaged with the top of the container 10, and the diameter internally of the sleeve 11 is such that the opposed lower outer portions of the bimetallic element 16 abut the internal surface of the sleeve when the space between the inwardly turned lower end of the bimetallic element 16 is less than the diameter of the detent 15 but greater than the diameter of either the detents 13 or 14.

To provide means for externally indicating the internal position of the movable member 12, a semaphore support 18 extends normally substantially coaxially downward from the container 10, and is swingably supported from the movable member 12 on the pivot 19. The upper end of the semaphore support 18 is provided with a laterally bent portion arranged to engage the lower surface of the member 12 laterally with respect to the pivot 18, to prevent counter-clockwise rotation of the support 18 about its pivotal mounting. The upper portion of the support 18 is rounded on the opposite side of the pivot 19 to permit clockwise rotation, and the retracting spring 20 is arranged to cooperate with the stop pin 21 and the member 12 to continually bias the support 18 to the normal coaxial position.

The semaphores 22 and 24 are swingably mounted at the lower end of the support 18 on the pivot 26, the latter, as shown in Fig. 5, extending laterally through the semaphores 22 and 24, and the interposed spacing washers 27, the pivot 26 being retained in the desired position by a cotter or other suitable means. At a point between the pivots 26 and 19, a flat member 29 extends horizontally across the semaphore support 18, and is rigidly secured thereto at about its midpoint by means of the rivet 30. One of the outer ends of the member 29 is formed as a hook to limit the clockwise rotation of the semaphores 22 and 24 about the pivot 26. As shown in Fig. 1, when in the normal position, the semaphores 22 and 24 extend from the pivot 26 upwardly into the lower open end of the container 10, and while the semaphores tend to rotate in a clockwise direction under the influence of gravity, they are held in the normal position through the engagement of the respective upwardly extending portions 23 and 25 with the inner surface of the container 10.

In Fig. 6 is illustrated an application of the device, designated in its entirety by the numeral 31, to the tank-wall 34. A mounting clip 32 is arranged to clasp the device, and a resilient support 33 arranged to continuously urge the device to abutment with the tank-wall.

To facilitate description of the operation of the device, assume its elements to be in the normal position illustrated in Fig. 1, and that surrounding conditions are such that the temperature of the bimetallic element is increasing to cause the lower ends thereof to move outwardly or away from one another. When the space between the lower ends is that of the diameter of the lower detent 13, all of the reciprocably movable parts of the device move downwardly until such movement is stopped by the engagement of the intermediate and larger detent 14 with the inwardly bent portions of the bimetallic element 16. The downward movement just described causes the withdrawal of the portion 23 of the semaphore 22 from its engagement with the inner surface of the container 10, following which the semaphore 22 rotates under the influence of gravity to the position shown in Fig. 2, the device being shown in this figure in the first indicating position.

As the heating of the element 16 continues to another higher predetermined temperature, the detent 14 passes downwardly between the inwardly bent end portions of the bimetallic element, the inwardly extending portion 25 of the semaphore 24 is withdrawn from the container 10, and the elements of the device assume the positions illustrated by Fig. 3, in which the device is shown in the second indicating position. In the latter position, the opposed outwardly bent lower portions of the element 16 may engage the inner surface of the sleeve 11, and when in such position, the detent 15 will not pass downwardly through the space between the ends of the bimetallic element 16, thus providing a support for the endwise movable portions of the device.

In the device as above described, the parts will not latch in the normal position unless the temperature of the element is at or below a predetermined temperature, but assuming such is the case, re-latch to the normal position is accomplished by first rotating both semaphores in a counter-clockwise direction to engagement with the semaphore stop 29, then swinging the semaphore support 18 in a clockwise direction against the bias of the spring 20 and concurrently pushing upwardly against the pin 19 until the upper end of the guide sleeve 11 engages the inner surface of the upper end of the tubular container 10.

While I have herein described a device provided with only two indicating positions, it will be apparent that additional detents and semaphores may be added to make available a larger number of indications.

I claim, as my invention:

1. A temperature indicator comprising a hollow container, a member reciprocably movable to a plurality of predetermined positions with respect to said container while positioned therein, a bimetallic element which bends laterally with respect to the direction of movement of said movable member when heated, said element being rigidly secured to and within said container, said bimetallic element cooperating with means carried by said movable member to sequentially establish said plurality of positions in the response to the sequential attainment of a corresponding plurality of predetermined temperatures, said movable member carrying means limiting the lateral movement of the bimetallic element and thereby limiting the endwise movement of said movable member, and indicating means carried by said movable member externally of said container, said indicating means being adapted for visibly indicating the respective positions.

2. A tank-wall temperature indicating device comprising a hollow tubular container closed at the upper end and open at the lower end, a reciprocably movable member within the hollow of said container and arranged for endwise movement within said container, a bimetallic element secured at the upper end of said container and extending downwardly therefrom within the hollow of and in spaced relationship therewith to a point near its open end, said movable member having a detent for engaging said bimetallic element at the lower end thereof for normally restraining movement of said movable member and for releasing said movable member for endwise movement in response to a predetermined sidewise movement of said bimetallic element, and a sleeve nested within said container and rigidly secured to said movable member for continuously restraining sidewise movement of said movable member, said sleeve providing means for limiting the sidewise movement of said bimetallic element, and indicating means carried by said movable member externally of said container, said indicating means being adapted for visibly indicating the occurrence of said endwise movement.

3. A tank-wall temperature indicating device comprising a hollow tubular container closed at the upper end and open at the lower end, a reciprocably movable member within the hollow of said container and arranged for endwise movement within said container, a bimetallic element secured at the upper end of said container and extending downwardly therefrom within the hollow of and in spaced relationship therewith to a point near its open end, said movable member having a detent for engaging said bimetallic element at the lower end thereof for normally restraining movement of said movable member and for releasing said movable member for endwise movement toward the open end of said container in response to a predetermined sidewise movement of said bimetallic element, and a sleeve nested within said container and rigidly secured to said movable member for continuously restraining sidewise movement of said movable member, said sleeve cooperating with said bimetallic element to limit the endwise movement of said movable member in the direction toward the open end of said container, and indicating means carried by said movable member externally of said container, said indicating means being adapted for visibly indicating the occurrence of said endwise movement.

4. A temperature indicator comprising a hollow tubular container closed at the upper end and open at the lower end, a reciprocably movable member within the hollow of said container and arranged for endwise movement within said container, a bimetallic element secured at the upper end of said container and extending downwardly therefrom within the hollow of and in spaced relationship with respect to said container to a point near its open end, said movable member having a detent for engaging said bimetallic element at the lower end thereof for normally restraining movement of said movable member and for releasing said movable member for endwise movement in response to a predetermined sidewise movement of said bimetallic element, and a sleeve nested within said container and rigidly secured to said movable member for continuously restraining sidewise movement of said movable member, said sleeve providing common means for limiting the sidewise movement of said bimetallic element and the endwise movement of said movable member, and indicating means carried by said movable member externally of said container, said indicating means being adapted for visibly indicating the occurrence of said endwise movement.

5. A temperature indicator comprising a hollow tubular container closed at the upper end and open at the lower end, a reciprocably movable member within the hollow of said container and arranged for endwise movement within said container, a bimetallic element secured at the upper end of said container and extending downwardly therefrom within the hollow of and in spaced relationship therewith to a point near its open end, said movable member having a detent for engaging said bimetallic element at the lower end thereof for normally restraining movement of said movable member and for releasing said movable member for endwise movement toward the open end of said container in response to a predetermined sidewise movement of said bimetallic element, and a sleeve rigidly secured to and encompassing said movable member and nested within said container for continuously restraining sidewise movement of said movable member, said sleeve cooperating with said bimetallic element to and thereby limiting the endwise movement of said movable member to a position within said container following disengagement of said bimetallic element from said detent, and indicating means carried by said movable member externally of said container, said indicating means being adapted for visibly indicating the occurrence of said endwise movement.

6. A temperature indicator comprising a hollow tubular container closed at the upper end and open at the lower end, a reciprocably movable member within the hollow of said container and arranged for endwise movement within said container, a bimetallic element secured at the upper end of said container and extending downwardly therefrom within the hollow of and in spaced relationship therewith to a point near its open end, said movable member having a detent for engaging said bimetallic element at the lower end thereof for normally restraining movement of said movable member and for releasing said movable member for endwise movement toward the open end of said container in response to a predetermined sidewise movement of said bimetallic element, and a sleeve rigidly secured to and encompassing said movable member and nested within said container for continuously restraining sidewise movement of said movable member, said sleeve cooperating with said container to establish the normal position of said detent with respect to said bimetallic element in response to movement of said movable member in a direction toward the closed end of said container, and indicating means carried by said movable member externally of said container and adapted for visibly indicating the occurrence of said endwise movement toward the open end of said container.

7. The combination with a temperature indicator having an open end container, a member reciprocably movable within said container, and thermally responsive means for controlling the movement of the movable member from a normal to a plurality of predetermined positions, of indicating means externally of said container for visually indicating the internal position of said movable member, said indicating means comprising a laterally swingable semaphore support fastened to said movable member and normally extending outwardly from said container in the direction of motion of said movable member, resilient means normally holding said semaphore support in the normal position, a plurality of semaphores mounted for rotary movement about a common pivot at the outer end of said support, said semaphores normally extending upwardly from said pivot to latched engagement with the inner surface of the open end of said container, and means for selectively releasing said semaphores for rotary movement in response to the sequential movement of said movable member from said normal to said predetermined positions.

CARROLL H. WALSH.